United States Patent
Li et al.

(10) Patent No.: US 12,547,178 B2
(45) Date of Patent: Feb. 10, 2026

(54) NAVIGATION METHOD, NAVIGATION APPARATUS AND NON-VOLATILE COMPUTER STORAGE MEDIUM

(71) Applicant: HAI ROBOTICS CO., LTD., Guangdong (CN)

(72) Inventors: Huixiang Li, Guangdong (CN); Jui-chun Cheng, Guangdong (CN); Shengdong Xu, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 237 days.

(21) Appl. No.: 18/054,997

(22) Filed: Nov. 14, 2022

(65) Prior Publication Data
US 2023/0075332 A1    Mar. 9, 2023

Related U.S. Application Data

(63) Continuation of application No. PCT/CN2021/094943, filed on May 20, 2021.

(30) Foreign Application Priority Data

May 21, 2020  (CN) .......... 202010434283.6
May 21, 2020  (CN) .......... 202010434284.0

(51) Int. Cl.
*G05D 1/00*     (2024.01)
(52) U.S. Cl.
CPC ......... *G05D 1/0234* (2013.01); *G05D 1/0253* (2013.01); *G05D 1/028* (2013.01); *G05D 1/0287* (2013.01)
(58) Field of Classification Search
CPC .... G05D 1/0234; G05D 1/0253; G05D 1/028; G05D 1/0287; G01C 21/3415; G01C 21/3446; G01C 21/3804
(Continued)

(56) References Cited

U.S. PATENT DOCUMENTS

| | | |
|---|---|---|
| 4,899,285 A | 2/1990 | Nakayama et al. |
| 2003/0187577 A1 | 10/2003 | McClure |

(Continued)

FOREIGN PATENT DOCUMENTS

| | | |
|---|---|---|
| CA | 2279877 C | 9/2005 |
| CN | 1846240 A | 10/2006 |

(Continued)

OTHER PUBLICATIONS

International search report for PCT/CN2021/094943.
(Continued)

*Primary Examiner* — Tiffany P Young
*Assistant Examiner* — Ashleigh Nicole Turnbaugh
(74) *Attorney, Agent, or Firm* — Frank Gao, Esq.

(57) ABSTRACT

This application relates to a navigation method and a navigation apparatus. The navigation method is executed by a mobile carrier and includes: moving along a preset guide trajectory body according to obtained target location information; and determining whether a current state of the mobile carrier is out-of-position, and in response to determining that the current state of the mobile carrier is out-of-position, obtaining current initialization location information of the mobile carrier after moving to a preset initialization tag. According to embodiments of the disclosure, reliable operation of the mobile carrier is ensured by re-initializing the mobile carrier in a case that an error occurs in the mobile carrier along the preset guide trajectory body.

16 Claims, 7 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 2016/0327951 | A1* | 11/2016 | Walton | G05D 1/69 |
| 2020/0081454 | A1 | 3/2020 | Kwak | |
| 2020/0249692 | A1* | 8/2020 | Thode | G05D 1/2437 |
| 2021/0223783 | A1* | 7/2021 | M | B60W 60/00256 |

FOREIGN PATENT DOCUMENTS

| | | | |
|---|---|---|---|
| CN | 102818568 | A | 12/2012 |
| CN | 103559396 | A | 2/2014 |
| CN | 104181926 | A | 12/2014 |
| CN | 105066988 | A | 11/2015 |
| CN | 105806337 | A | 7/2016 |
| CN | 106541404 | A | 3/2017 |
| CN | 106709692 | A | 5/2017 |
| CN | 106873583 | A | 6/2017 |
| CN | 107341629 | A | 11/2017 |
| CN | 206671887 | U | 11/2017 |
| CN | 107422355 | A | 12/2017 |
| CN | 107592921 | A | 1/2018 |
| CN | 108180912 | A | 6/2018 |
| CN | 108202965 | A | 6/2018 |
| CN | 108225303 | A | 6/2018 |
| CN | 108469786 | A | 8/2018 |
| CN | 108495261 | A | 9/2018 |
| CN | 108759853 | A | 11/2018 |
| CN | 108803603 | A | 11/2018 |
| CN | 108955668 | A | 12/2018 |
| CN | 109000647 | A | 12/2018 |
| CN | 109240299 | A | 1/2019 |
| CN | 109375626 | A | 2/2019 |
| CN | 109443392 | A | 3/2019 |
| CN | 109508021 | A | 3/2019 |
| CN | 109767151 | A | 5/2019 |
| CN | 110186459 | A | 8/2019 |
| CN | 110187703 | A | 8/2019 |
| CN | 110322194 | A | 10/2019 |
| CN | 110361011 | A * | 10/2019 |
| CN | 110456820 | A | 11/2019 |
| CN | 110703745 | A * | 1/2020 |
| CN | 110888427 | A | 3/2020 |
| CN | 110909260 | A | 3/2020 |
| CN | 110956665 | A | 4/2020 |
| CN | 111045434 | A | 4/2020 |
| CN | 111552297 | A | 8/2020 |
| CN | 111578930 | A | 8/2020 |
| CN | 111754163 | A | 10/2020 |
| GB | 0302087 | | 2/2003 |
| JP | H02111206 | A | 4/1990 |
| JP | 2013050803 | A | 3/2013 |
| JP | 2019522301 | A | 8/2019 |
| WO | 2017083424 | A1 | 5/2017 |
| WO | WO2018180247 | A1 | 10/2018 |
| WO | WO2019154443 | A2 | 8/2019 |
| WO | 2019184179 | A1 | 10/2019 |

OTHER PUBLICATIONS

Author: Pengfei Liu; Article title: Intelligent AGV control system of visual navigation and applicationon; Published date: May 15, 2014; Issue 05, (2014) Published in China excellent master's thesis full text database Information science and technology series; China.

Author: Jubin Zhong; Article title: Design of an AGV System Combining Multiple Navigation Technologies; Published date: Jul. 15, 2016; Issue 07, (2016); Published in China excellent master's thesis full text database Information science and technology series; China.

Author: Shengdong Xu, etc.; Article Title:Real-Time 3D Navigation for Autonomous Vision-Guided MAVs; Published in «2015 IEEE/ RSJ International Conference on Intelligent Robots and Systems (IROS)»; Publisher: IEEE; Date of Conference: 28 Sep. 28, 2015-Oct. 2, 2015; Date Added to IEEE Xglore: Dec. 17, 2015; Conference Location: Hamburg, Germany.

Author: Jiang Yanwei, etc; Article title: Design of GMI micro-magnetic sensor and its application for geomagnetic navigation; Source: «2008 2nd International Symposium on Systems and Control in Aerospace and Astronautics»—ISSCAA 2008; Art. No.: 4776397; China.

Author: Jia Kuo; Article Title:A New Kind of Heavy Load AGV Design and Application; Journal: Logistics Sci-Tech; volume-issue numbe: No.7, 2019;China.

Extended European Search Report dated Oct. 2, 2023; Appln. No. 21807612.318054997.

* cited by examiner

NAVIGATION METHOD, NAVIGATION APPARATUS AND NON-VOLATILE COMPUTER STORAGE MEDIUM

CROSS-REFERENCE TO RELATED APPLICATIONS

This application is a continuation of International Patent Application No. PCT/CN2021/094943 filed on May 20, 2021, which claims priority to Chinese Patent Application No. CN202010434283.6 filed to the China National Intellectual Property Administration on May 21, 2020 and entitled "NAVIGATION METHOD AND NAVIGATION APPARATUS", and priority to Chinese Patent Application No. CN202010434284.0 filed to the China National Intellectual Property Administration on May 21, 2020 and entitled "NAVIGATION METHOD AND NAVIGATION APPARATUS", which are incorporated herein by reference in its entirety.

TECHNICAL FIELD

This application relates to the technical field of navigation, and in particular, to a navigation method, a navigation apparatus and a non-volatile computer storage medium.

BACKGROUND

Navigation technology is widely applied to various industries, such as cargo warehousing, home furnishing or fire protection. In virtue of the navigation technology, mobile carriers may satisfy various service needs.

During the operation of the mobile carriers, errors may occur due to out-of-position and other reasons. Therefore, it is necessary to provide a processing mechanism when the mobile carrier is in error to ensure reliable operation of the mobile carrier.

SUMMARY

This application relates to a navigation method and a navigation apparatus for solving problems of the related art.

In a first aspect, this application provides a navigation method executed by a mobile carrier and including: moving along a preset guide trajectory body according to obtained target location information; and determining whether a current state of the mobile carrier is out-of-position, and if yes, obtaining current initialization location information of the mobile carrier after moving to a preset initialization tag along the preset guide trajectory body.

According to embodiments of this application, reliable operation of the mobile carrier is ensured by re-initializing the mobile carrier in a case that an error occurs in the mobile carrier.

In a second aspect, this application provides a navigation method executed by a server and including: transmitting target location information to a mobile carrier, the error notification is transmitted in a case that a current state of the mobile carrier is out-of-position; receiving an error notification transmitted by the mobile carrier; and transmitting a control command to at least one of the mobile carrier and a user terminal, so that the mobile carrier moves to a preset initialization tag along a preset guide trajectory body.

In a third aspect, this application provides a navigation apparatus, including: a processor; and a memory, having executable codes stored thereon, the executable codes, when executed by the processor, causing the processor to execute the method in the first or second aspect.

In a fourth aspect, this application provides a navigation method executed by a mobile carrier and including: obtaining current location information of the mobile carrier, and moving along a preset guide trajectory body according to the current location information and obtained target location information; and transmitting the current location information to a server.

In the navigation solutions of some embodiments provided in this application, since the current location information of the mobile carrier is obtained by using the preset fiducial tags, a progressive error in the current location information may be eliminated at each fiducial tag, so that the location information of the mobile carrier obtained by the server may be more accurate, and therefore the navigation accuracy may be improved.

In a fifth aspect, this application provides a navigation method executed by a mobile carrier and including: obtaining current location information of the mobile carrier and moving along a preset guide trajectory body according to the current location information and obtained target location information; and transmitting the current location information to a server. The obtaining current location information of the mobile carrier includes obtaining the current location information of the mobile carrier in response to sensing a preset fiducial tag. The preset fiducial tag includes a plurality of preset fiducial tags arranged along the preset guide trajectory body, and the plurality of preset fiducial tags are not unique.

In some embodiments, the obtaining current location information of the mobile carrier includes obtaining pre-stored fiducial tag location information corresponding to the preset fiducial tag in response to sensing the preset fiducial tag; and obtaining the current location information of the mobile carrier according to the pre-stored fiducial tag location information.

In some embodiments, the obtaining pre-stored fiducial tag location information corresponding to the preset fiducial tag includes obtaining current estimated location information of the mobile carrier, and obtaining, according to the current estimated location information, the pre-stored fiducial tag location information corresponding to the preset fiducial tag.

In some embodiments, the obtaining pre-stored fiducial tag location information corresponding to the preset fiducial tag includes obtaining fiducial tag spacing information and a number of sensed preset fiducial tags that have been passed in response to sensing the preset fiducial tags; and obtaining, according to the spacing information and the number of preset fiducial tags, the pre-stored fiducial tag location information corresponding to the preset fiducial tag.

In some embodiments, the obtaining pre-stored fiducial tag location information corresponding to the preset fiducial tag includes obtaining current estimated location information of the mobile carrier and at least one piece of feature information of the preset fiducial tag; and obtaining, according to the estimated location information and the at least one piece of feature information, the pre-stored fiducial tag location information corresponding to the preset fiducial tag.

In some embodiments, the obtaining pre-stored fiducial tag location information corresponding to the preset fiducial tag includes: obtaining a type of the preset fiducial tag and a number of sensed preset fiducial tags that have been passed in response to sensing the preset fiducial tags; determining fiducial tag spacing information according to the type of the preset fiducial tag; and obtaining, according to the spacing information and the number of preset fiducial tags, the pre-stored fiducial tag location information corresponding to the preset fiducial tag.

In some embodiments, the obtaining the current location information of the mobile carrier according to the pre-stored fiducial tag location information includes taking the pre-stored fiducial tag location information as the current location information of the mobile carrier; or taking an operation result obtained by performing a predetermined operation on the pre-stored fiducial tag location information as the current location information of the mobile carrier.

In some embodiments, the taking an operation result obtained by performing a predetermined operation on the pre-stored fiducial tag location information as the current location information of the mobile carrier includes: obtaining current estimated location information of the mobile carrier; obtaining, according to the current estimated location information, the pre-stored fiducial tag location information corresponding to the fiducial tag from preset map information; obtaining a deviation between the location of the mobile carrier and the fiducial tag according to an image captured by an imaging apparatus; and obtaining an image-based mobile carrier location according to the pre-stored fiducial tag location information and the deviation, and performing fusion calculation on the pre-stored fiducial tag location information, the current estimated location information, and the image-based mobile carrier location according to a predetermined method to obtain the current location information of the mobile carrier.

In some embodiments, the moving along a preset guide trajectory body includes generating trajectory sensing information based on sensing of the preset guide trajectory body; and limiting the mobile carrier to move along the preset guide trajectory body according to the trajectory sensing information.

In some embodiments, the moving along a preset guide trajectory body includes making an imaging apparatus disposed on the mobile carrier sense the preset guide trajectory body, and generating trajectory image information; obtaining, according to the trajectory image information, at least one of an angle deviation between a current movement direction of the mobile carrier and the preset guide trajectory body and a location deviation between a current location of the mobile carrier and the preset guide trajectory body; and correcting movement of the mobile carrier according to at least one of the angle deviation and the location deviation.

In some embodiments, the preset guide trajectory body includes at least one of a light-emitting strip, a color strip with a same color, and a color strip with different colors alternately arranged.

In some embodiments, the preset guide trajectory body is at least one of a continuous trajectory and a discontinuous trajectory; some or all preset guide trajectory bodies are the same; and the preset guide trajectory body is a color strip with different colors alternately arranged.

In some embodiments, the preset fiducial tag includes a plurality of preset fiducial tags, and the plurality of preset fiducial tags are not unique.

In some embodiments, the preset fiducial tags comprise some or all of symbols, characters, figures, colors, graphics, and color change boundaries.

In a sixth aspect, this application provides a navigation method, executed by a server, including: transmitting target location information to a mobile carrier; and receiving current location information of the mobile carrier.

In a seventh aspect, this disclosure provides a navigation method, executed by a server, and including: transmitting target location information to a mobile carrier; and receiving current location information of the mobile carrier. The receiving current location information transmitted by the mobile carrier further includes receiving preset fiducial tag related information transmitted by the mobile carrier; obtaining pre-stored fiducial tag location information corresponding to the preset fiducial tag; and transmitting the pre-stored fiducial tag location information to the mobile carrier.

In some embodiments, the obtaining pre-stored fiducial tag location information corresponding to the preset fiducial tag includes reading the pre-stored fiducial tag location information corresponding to the preset fiducial tag from preset map information.

In some embodiments, the preset fiducial tag related information includes the current estimated location information of the mobile carrier; and the obtaining pre-stored fiducial tag location information corresponding to the preset fiducial tag includes obtaining the pre-stored fiducial tag location information corresponding to the current estimated location information.

In some embodiments, the obtaining the pre-stored fiducial tag location information corresponding to the current estimated location information includes reading pre-stored fiducial tag location information of a fiducial tag closest to the current estimated location information from the preset map information.

In some embodiments, the preset fiducial tag related information comprises a number of preset fiducial tags that the mobile carrier has passed; and the obtaining pre-stored fiducial tag location information corresponding to the preset fiducial tag includes obtaining fiducial tag spacing information, and obtaining, according to the fiducial tag spacing information and the number of preset fiducial tags, the pre-stored fiducial tag location information corresponding to the preset fiducial tag.

In some embodiments, the preset fiducial tag related information comprises the current estimated location information of the mobile carrier; and the obtaining pre-stored fiducial tag location information corresponding to the preset fiducial tag includes: obtaining at least one piece of feature information of the preset fiducial tag, and obtaining corresponding pre-stored fiducial tag location information according to the estimated location information and the at least one piece of feature information.

In some embodiments, the preset fiducial tag related information includes a type of the preset fiducial tag and a number of preset fiducial tags that the mobile carrier has passed; and the obtaining pre-stored fiducial tag location information corresponding to the preset fiducial tag comprises: determining fiducial tag spacing information according to the type of the preset fiducial tag, and obtaining, according to the spacing information and the number of preset fiducial tags, the pre-stored fiducial tag information corresponding to the preset fiducial tag.

In a eighth aspect, this application provides a navigation apparatus, including: a processor; and a memory, having executable codes stored thereon, the executable codes, when executed by the processor, causing the processor to execute the method in the fourth to seventh aspect.

In a ninth aspect, the disclosure provides a non-volatile computer storage medium, storing computer executable instructions, the computer executable instructions, when executed by a processor, cause the processor to execute the method in the fourth to seventh aspect.

This application provides a navigation method and a navigation apparatus. The navigation method is executed by a mobile carrier and includes moving along a preset guide trajectory body according to obtained target location information; and determining whether a current state of the mobile carrier is out-of-position, and if yes, obtaining current initialization location information of the mobile carrier after moving to a preset initialization tag. According to embodiments of this application, reliable operation of the mobile carrier is ensured by re-initializing the mobile carrier in a case that an error occurs in the mobile carrier.

BRIEF DESCRIPTION OF THE DRAWINGS

To describe the technical solutions in the embodiments of this application or the related art more clearly, the accompanying drawings required for describing the embodiments or the related art are briefly described hereinafter. Apparently, the accompanying drawings in the following description show merely some embodiments of this application, and a person of ordinary skill in the art may obtain other accompanying drawings from these accompanying drawings without creative efforts.

DETAILED DESCRIPTION

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are merely some rather than all the embodiments of this application. All other embodiments obtained by a person of ordinary skill in the art based on the embodiments of this application without creative efforts shall fall within the protection scope of this application.

The mobile carrier provided herein may be applied to any suitable industry field or technical field, such as the field of smart warehousing, the field of smart logistics, the field of smart sorting, the field of home furnishing, or the field of fire protection.

In a case that the mobile carrier is applied to different industries, the mobile carrier may be configured into different structures to realize corresponding service functions. For example, in a case that the mobile carrier is applied to the household field, the mobile carrier may be configured as a circular sweeping robot, and in a case that the mobile carrier is applied to the warehousing field, the mobile carrier may be configured with a robotic arm to grab goods.

Figure 1:
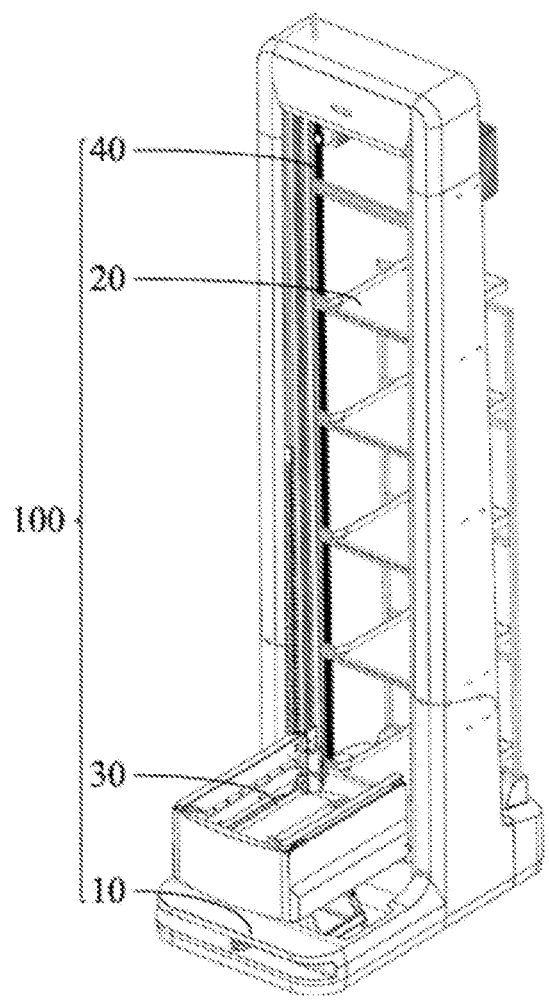
FIG. 1 is a schematic structural diagram of a mobile carrier according to an embodiment of this application.
Figure 2:
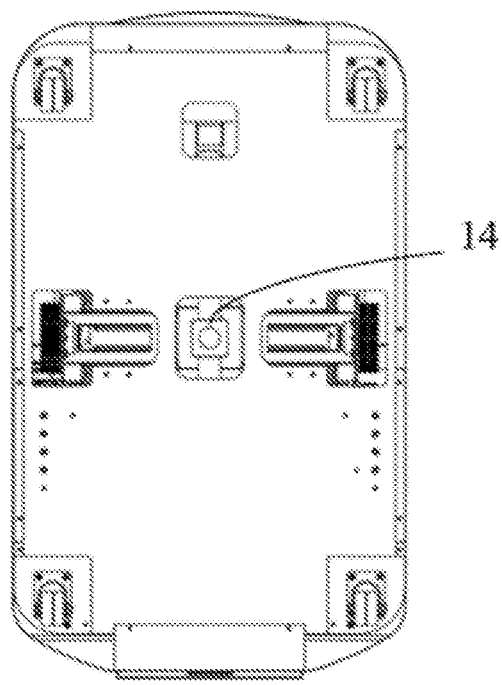
FIG. 2 is a schematic structural diagram of a mobile chassis in FIG. 1.

Embodiments of this application provide a mobile carrier. Referring to FIG. 1 and FIG. 2, the mobile carrier 100 includes a mobile chassis 10, a storage shelf 20, a handling apparatus 30, and a lifting or lowering assembly 40. The storage shelf 20, the handling apparatus 30, and the lifting or lowering assembly 40 are mounted on the mobile chassis 10.

The mobile chassis 10 is configured to carry the mobile carrier 100 to move according to a planned path.

The storage shelf 20 is configured to store goods. In some embodiments, the storage shelf 20 may include a plurality of storage units arranged in a vertical direction. each storage unit may be configured to hold one or more goods.

The handling apparatus 30 is capable of moving along the vertical direction, so that the location of the handling apparatus 30 faces to any one of the storage units in horizontal direction. The handling apparatus 30 is configured to transport goods between a preset location of a fixed shelf and any one of the storage units.

The lifting or lowering assembly 40 is configured to drive the handling apparatus 30 to move along the vertical direction relative to the storage shelf 20. The lifting or lowering assembly 40 includes a lifting or lowering transmission mechanism and a lifting or lowering driving mechanism. The lifting or lowering driving mechanism is configured to provide a driving force for the handling apparatus 30 to move along the vertical direction relative to the storage shelf 20, and the lifting or lowering transmission mechanism is configured to transmit the driving force to the handling apparatus 30.

In some embodiments, the mobile chassis 10 includes a bracket assembly, a driven wheel, a drive wheel assembly, and a guide apparatus 14 (see FIG. 2). The driven wheel, the drive wheel assembly, and the guide apparatus 14 are mounted on the bracket assembly.

The guide apparatus 14 may be a camera, and a lens of the camera faces the ground, and is configured to identify a guide trajectory body and a fiducial tag laid on the ground, so that the mobile chassis 10 travels along the guide trajectory body. It is understood that, in some other embodiments, another guide trajectory body and the fiducial tag may be laid at other locations, and correspondingly, another camera may be provided, and a lens of the another camera faces another guide trajectory body and the fiducial tag.

Figure 3:
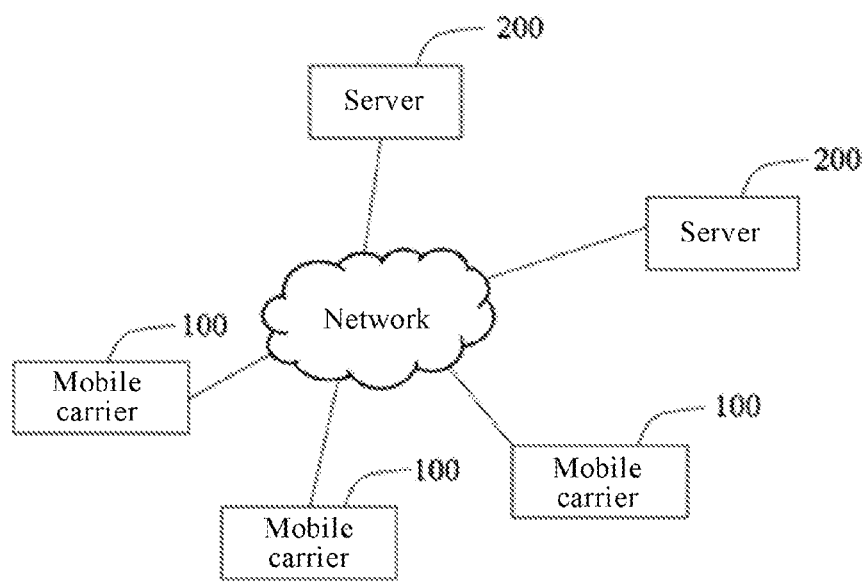
FIG. 3 is a schematic structural diagram of a navigation system according to an embodiment of this application.

In some embodiments, referring to FIG. 3, the mobile carrier 100 may form a navigation system with a server 200, and may be in communicated with the server 200 to realize navigation, thereby successfully grabbing or depositing the goods.

In some embodiments, the server 200 here may be a physical server or a logic server virtualized by a plurality of physical servers. The server 200 may also be a server group composed of a plurality of servers that may be in communication with each other, and each functional module may be distributed on each server in the server group.

In the embodiments of this application, in a case that the mobile carrier 100 moves in a warehouse, positioning and navigation may be aided by virtue of at least one of a preset guide trajectory body and a preset fiducial tag in the warehouse. The preset fiducial tag may be, for example, formed by providing a guide trajectory body.

Figure 4:
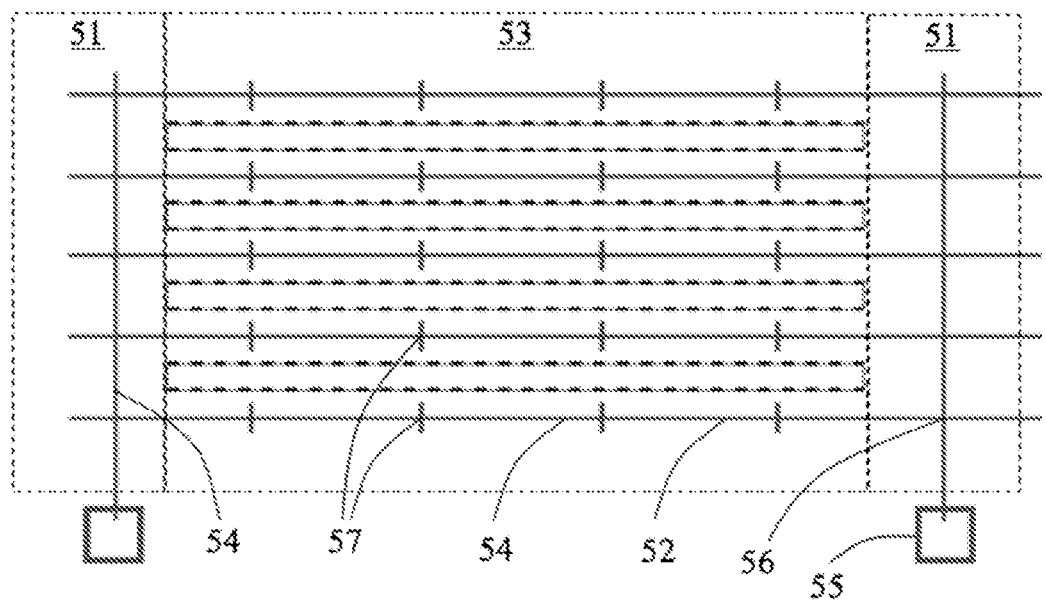
FIG. 4 is a schematic diagram of arrangement of a guide trajectory body and a fiducial tag on a warehouse floor according to an embodiment of this application.

FIG. 4 is a schematic diagram of arrangement of a guide trajectory body and a fiducial tag on a warehouse floor according to an embodiment of this application. As shown in FIG. 4, the warehouse floor is divided into different working areas, including a public area 51 having no shelf and other obstacle, and a roadway area 53 located between shelves 52 placed at intervals. The plurality of mobile carriers may travel in the public area 51. The mobile carrier needs to move in different directions in response to picking up and placing goods. For example, in a case that the mobile carrier needs to move from the public area 51 to a target location in the roadway area 53, it may make a rotating motion before entering the roadway area 53, adjust an advancing direction to be parallel to the shelves 52, and make a linear motion to advance to the target location.

Both the public area 51 and the roadway area 53 are provided with the guide trajectory body 54. In the embodiment of FIG. 4, the guide trajectory body 54 is a straight trajectory with a uniform width disposed on the ground. The guide trajectory body 54 in the roadway area 53 is parallel to the shelves 52. The guide trajectory body 54 in the public area 51 is perpendicular to the guide trajectory body 54 in the roadway area 53. It is to be understood that the location, shape, direction and other settings of the guide trajectory body 54 may be determined according to the actual situations, and this application is not limited thereto.

Moreover, for example, the guide trajectory body 54 may be disposed only in the public area 51 or only in the roadway area 53, or the guide trajectory body 54 is disposed only in part of a working area of the public area 51 or the roadway area 53. Navigation may be performed on the working area provided with the guide trajectory body 54 by the method provided in this application, and navigation may be performed on the working area without the guide trajectory body by other suitable methods. For example, the guide trajectory body and the fiducial tag are only provided in the roadway area 53 (the fiducial tag is, for example, formed by intersecting tags arranged at intervals on the guide trajectory body, or formed by color change boundaries of the guide trajectory body of different colors), while the public area 51 is not provided with the guide trajectory body or the fiducial tag, therefore, in the roadway area 53, navigation may be performed by the method provided in this application, and in the public area, for example, visual navigation may be used.

In addition, in one embodiment, both the public area 51 and the roadway area 53 are provided with the guide trajectory body and the fiducial tag. Both the guide trajectory body in the public area 51 and the guide trajectory body in the roadway area 53 may be color strips of different colors alternately arranged. Both the fiducial tag in the public area 51 and the fiducial tag in the roadway area 53 are formed by color change boundaries of the color strips. Moreover, the color of the color strip in the public area 51 is different from that of the color strip in the roadway area 53 (for example, the color of the color strip in the public area 51 is red and blue alternately arranged, and the color of the color strip in the roadway area 53 is yellow and gray alternately arranged). In the public area 51 and the roadway area 53, navigation may still be performed by the method provided in this application.

The guide trajectory body in the public area may be connected to an initial location area 55. The initial location area 55 may be at least one of a location where the mobile carrier could be charged, and set as an initial location of the mobile carrier.

In FIG. 4, both the guide trajectory body 54 in the public area 51 and the guide trajectory body 54 in the roadway area 53 have a plurality of fiducial tags. There are a plurality of guide trajectory bodies in the public area 51, and there are a plurality of guide trajectory bodies in the roadway area 53. Intersections of the guide trajectory bodies 54 in the public area 51 and each guide trajectory body 54 in the roadway area 53 form fiducial tags 56 in the public area 51. Intersection tags arranged at intervals on each guide trajectory body 54 in the roadway area 53 form fiducial tags 57 in the roadway area. In this configuration, the fiducial tags 56 in the public area 51 are the same, the fiducial tags 57 in the roadway area 53 are the same, and the fiducial tags 56 in the public area are different from the fiducial tags 67 in the roadway area 53. Therefore, whether the mobile carrier is in the public area 51 or the roadway area 53 may be determined according to the form of the fiducial tag. It is to be understood that this application is not limited thereto. For example, in other embodiments, the fiducial tags 56 in the public area 51 may not be exactly the same, or the fiducial tags 57 in the roadway area 53 may not be exactly the same, or the fiducial tags in the public area 51 and the roadway area 53 may be exactly the same.

In some embodiments, the fiducial tags may be uniformly distributed on the guide trajectory bodies 54 in the public area and the roadway area in an array. The spacing between adjacent fiducial tags 56 in the public area 51 is equal to or not equal to the spacing between adjacent fiducial tags 57 in the roadway area 53. It is to be understood that, this application is not limited thereto.

For example, in other embodiments, the fiducial tags 56, 57 may be disposed independent of the guide trajectory bodies 54, for example, may be disposed near the guide trajectory bodies 54, or may be disposed at a location away from the guide trajectory bodies 54.

For another example, the fiducial tags may be disposed only in the public area 51 or only in the roadway area 53, or the fiducial tags are disposed only in part of a working area of the public area 51 or the roadway area 53.

For another example, the plurality of fiducial tags in the public area 51 and the roadway area 53 are not distributed in an array, but are distributed irregularly. For example, the spacing between each pair of adjacent fiducial tags is not equal, or the spacing between adjacent fiducial tags on a same guide trajectory body is equal, but the spacing between adjacent fiducial tags on different guide trajectory bodies is not equal.

Figure 5:
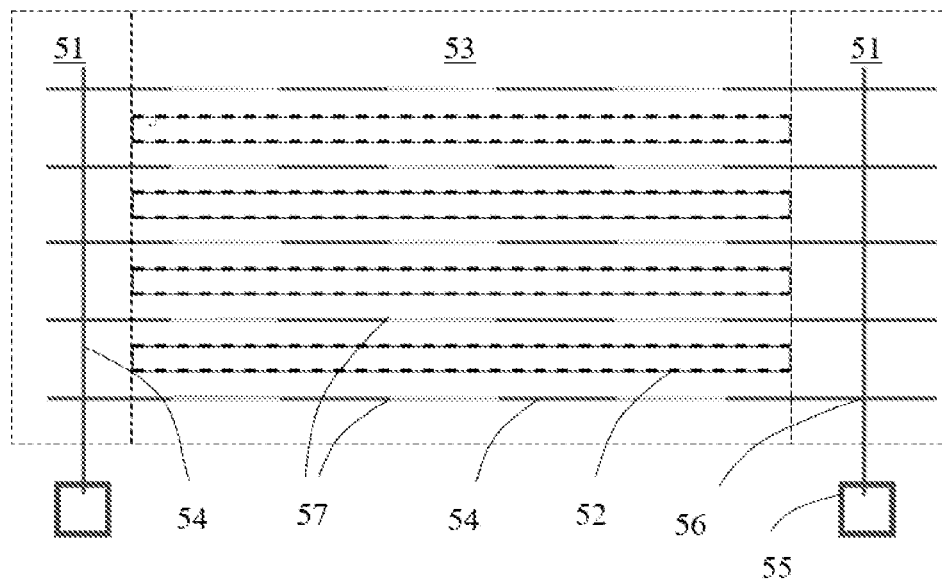
FIG. 5 is a schematic diagram of arrangement of a guide trajectory body and a fiducial tag on a warehouse floor according to another embodiment of this application.

In another implementation as shown in FIG. 5, similarly, the public area 51 and the roadway area 53 are provided with guide trajectory bodies 54. The guide trajectory bodies 54 in the public area 51 and the guide trajectory bodies 54 in the roadway area 53 have a plurality of fiducial tags. The plurality of fiducial tags are uniformly distributed on the guide trajectory bodies 54 in the public area 51 and the roadway area 53 in an array. Different from FIG. 4, in the implementation as shown in FIG. 5, each guide trajectory body 54 of the roadway area 53 includes a color strip of different colors that are uniformly and alternately arranged (shown as alternating black and gray in the figure, in other embodiments, for example, colors such as red and yellow may also be alternated). In the public area 51, the fiducial tags 56 are still formed by the intersection of the guide trajectory bodies 54 in the public area 51 and each guide trajectory body 54 in the roadway area 53. In the roadway area 53, color change boundaries of the color strip of different colors form the fiducial tags 57.

It is to be understood that FIG. 4 and FIG. 5 only exemplarily provide two implementations of the guide trajectory body 54 and the fiducial tags 56, 57, and this application is not limited thereto.

In the embodiments of this application, the guide trajectory body 54 and the fiducial tags 56, 57 may be laid on the ground, walls or shelf surfaces by ink printing, ink-printing, ultraviolet ink printing or fluorescent ink printing, etc. It is to be understood that, this application is not limited thereto.

In a case that the foregoing mobile carrier is a robot, in an related technology, the foregoing robot uses environmental data or travel data collected by an own sensor to complete navigation. However, considering that the robot itself has noise errors, with the continuous operation of the robot, the noise errors are accumulated, resulting in low navigation accuracy of the robot.

Figure 6:
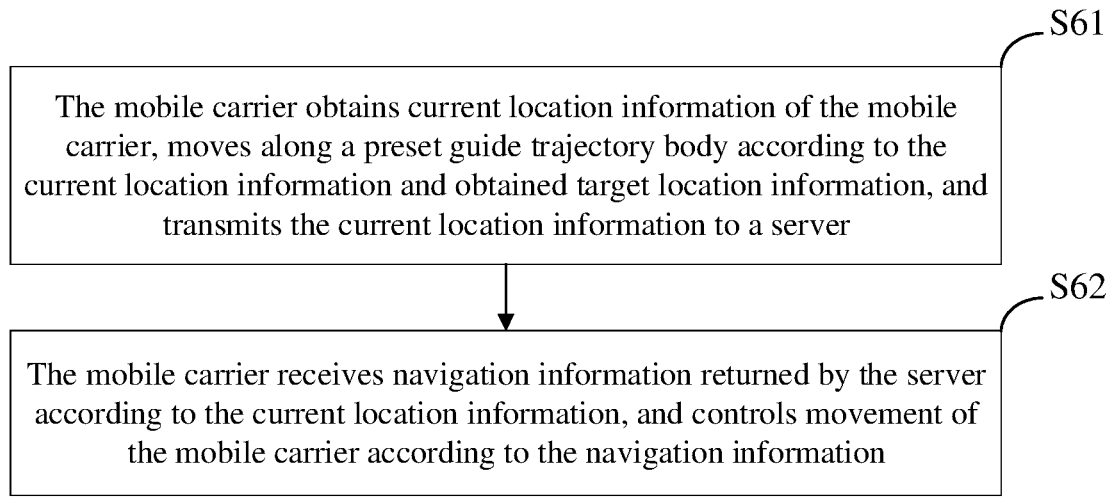
FIG. 6 is a schematic flowchart of a navigation method according to an embodiment of this application.

To solve the above technical problem, the embodiments of this application provide a navigation method as shown in FIG. 6 to improve the navigation accuracy of the robot.

FIG. 6 is a schematic flowchart of a navigation method, executed by a mobile carrier, according to an embodiment of this application. The mobile carrier may be configured as any suitable structure to complete corresponding service functions, for example, it may be configured as a sweeping robot or a warehousing robot and so on. Referring to FIG. 6, the method according to this embodiment includes the following operations:

S61: The mobile carrier obtains current location information of the mobile carrier and target location information, moves along a preset guide trajectory body according to the current location information and the target location information, and transmits the current location information to a server.

The preset guide trajectory body may be set in the manner described above, for example, and details are not described here.

In some embodiments, trajectory sensing information generated based on the sensing of the preset guide trajectory body may be obtained, and the movement of the mobile carrier is limited to be performed along the preset guide trajectory body according to the trajectory sensing information.

In some embodiments, the mobile carrier may be provided with an imaging apparatus, which may be configured as a camera of any shape. The imaging apparatus may be configured to photograph at least one of the guide trajectory body and the fiducial tag.

In a case that the mobile carrier moves on the guide trajectory body, the imaging apparatus of the mobile carrier continuously captures images of the guide trajectory body to generate trajectory image information. The mobile carrier may obtain an angle deviation between a current movement direction of the mobile carrier and at least one of the guide trajectory body and a location deviation between a current location of the mobile carrier and the guide trajectory body according to the trajectory image information. The movement of the mobile carrier is corrected according to at least one of the angle deviation and the location deviation, so that the mobile carrier moves along the guide trajectory body to prevent the mobile carrier from deviating from the guide trajectory body. The current movement direction of the mobile carrier may be, for example, sensed by a movement sensor provided in the mobile carrier.

In some embodiments, the mobile carrier is provided with a movement sensor that is mounted at a suitable location of the mobile carrier to sense the movement of the mobile carrier, thereby generating corresponding movement sensing information, such as a three-axis attitude angle, velocity, acceleration of the mobile carrier. The movement sensor may include, for example, an Inertial Measurement Unit (IMU), a gyroscope, a magnetic field meter, an accelerometer, or a speedometer, etc.

In some embodiments, before starting, the mobile carrier is in an initial location area. After starting, the mobile carrier obtains its initial location by communicating with the server, and then moves toward the working area along the preset guide trajectory body.

During the movement of the mobile carrier, the movement sensor senses real-time movement of the mobile carrier, and generates corresponding movement sensing information. A processor of the mobile carrier obtains the movement sensing information of the mobile carrier, and calculates current estimated location information of the mobile carrier at a current moment according to the movement sensing information of the current moment and the stored current location information of the previous one or more moments. It is to be understood that, in another implementation, the current estimated location information of the mobile carrier at the current moment may be calculated according to the movement sensing information of the mobile carrier and the origin location information in a corresponding preset map.

In some embodiments, the current location information varies with the movement of the mobile carrier. The current location information may be stored in a certain variable of a register in the mobile carrier. Each time the current location information of different places is updated, the mobile carrier iterates the current location information of the previous moment in the variable with the current location information of the current moment, and transmits the iterated current location information to the server.

In the embodiments of this application, the current location information may include coordinate data of the current place, relative location relationship data with other places, current three-axis attitude angle of the robot, or relative three-axis attitude angle relationship data with other places, and the like.

In some embodiments, the mobile carrier receives target location information, and the mobile carrier moves along the preset guide trajectory body according to the mobile location information until reaching a target location. In this process, the mobile carrier obtains the current location information, and transmits the current location information to the server, so that the server knows the current location of the mobile carrier. It is to be understood that the target location information may be final target location of the mobile carrier.

In some embodiments, the target location information obtained in S61 is an intermediate location on a path between the mobile carrier and the final target location. After the mobile carrier transmits the current location information to the server, the server transmits the navigation information to the mobile carrier. That is, the navigation method optionally also includes the following operation:

S62: The mobile carrier receives navigation information returned by the server according to the current location information, and controls movement of the mobile carrier according to the navigation information.

In some embodiments, after the mobile carrier transmits the current location information to the server, the server generates navigation information according to the received current location information and the target location of the mobile carrier, and transmits the generated navigation information to the mobile carrier.

In some embodiments, the server may generate navigation information according to the received current location information, the target location of the mobile carrier and stored historical location information of the mobile carrier, and transmit the generated navigation information to the mobile carrier. The historical location information of the mobile carrier stored by the server includes current location information of the mobile carrier at one or more previous moments.

In some embodiments, the navigation information generated by the server includes steering information. For example, in a case that the server determines that the mobile carrier is in the public area and needs to turn left or right to the roadway area, the navigation information transmitted to the mobile carrier may include corresponding steering information. After receiving the navigation information, the mobile carrier may slow down according to the steering information and move to the center of the fiducial tag, then turn left or right to the roadway area and continue to travel along the guide trajectory body.

In some embodiments, the navigation information generated by the server includes straight information. For example, in a case that the server determines that the mobile carrier is in the public area and does not reach a target roadway area, or in a case that the server determines that the mobile carrier is in the target roadway area but does not reach the location of a target shelf or goods, the navigation information transmitted to the mobile carrier may include straight information.

In some embodiments of this application, the obtaining current location information of the mobile carrier in S61 includes: obtaining the current location information of the mobile carrier in response to sensing a preset fiducial tag.

The preset fiducial tag may be, for example, set in the manner described above, for example, and details are not described here.

In some embodiments, the fiducial tag is provided on or near the guide trajectory body, and an imaging apparatus may be provided in the mobile carrier for capturing both the image of the guide trajectory body and the image of the fiducial tag. In other embodiments, the fiducial tag may be provided away from the guide trajectory body, and two imaging apparatuses may be provided in the mobile carrier for capturing the image of the guide trajectory body and the image of the fiducial tag, respectively.

In some embodiments, in a case that the mobile carrier senses a preset fiducial tag, pre-stored fiducial tag location information corresponding to the preset fiducial tag is obtained, and the current location information of the mobile carrier is obtained based on a pre-stored fiducial tag spacing information.

In a specific example, the mobile carrier moves in a working area. The working area uses a same fiducial tag, and a spacing value of each pair of adjacent fiducial tags is the same (for example, N1 meters). The spacing information of the fiducial tags pre-stored in the mobile carrier is the spacing value of adjacent fiducial tags. During the movement of the mobile carrier along the guide trajectory body, in a case that the imaging apparatus senses the preset fiducial tag, it can be known that the place where the mobile carrier is located at this time is N1 meters away from the previous fiducial tag; and according to the current estimated location information corresponding to the place at this time, the place at this time is N2 meters away from the previous fiducial tag, then the current location information is corrected from the current location information corresponding to N2 meters to the current location information corresponding to N1 meters.

In another specific example, the mobile carrier moves in a working area, and the working area uses a same fiducial tag, and the spacing value of each pair of adjacent fiducial tags are not exactly the same. For example, in two adjacent pairs of fiducial tags (N−1, N) and (N, N+1), the spacing value of the adjacent pair of fiducial tags (N−1, N) is M1 meters, and the spacing value of the adjacent pair of fiducial tags (N, N+1) is M2 meters. The spacing information of the fiducial tags pre-stored in the mobile carrier may include the spacing value of each pair of adjacent fiducial tags. During the movement of the mobile carrier along the guide trajectory body, fiducial tags that the mobile carrier has passed may be counted. In a case that the imaging apparatus senses an $N^{th}$ fiducial tag, it can be known from the counting that the place where the mobile carrier is located at this time is the $N^{th}$ fiducial tag, and the fiducial tag is M1 meters away from the previous fiducial tag; and according to the current estimated location information corresponding to the place at this time, the place at this time is M3 meters away from the previous fiducial tag, then the current location information is corrected from the current location information corresponding to M3 meters to the current location information corresponding to M1 meters.

In some embodiments, in a case that the mobile carrier senses a preset fiducial tag, pre-stored fiducial tag location information corresponding to the preset fiducial tag is obtained, and the current location information of the mobile carrier is obtained based on the pre-stored fiducial tag location information.

In this application, the pre-stored fiducial tag location information may be coordinate data of fiducial tags in pre-stored map data, or relative location relationship data with other places, and the like. The obtaining pre-stored fiducial tag location information corresponding to the preset fiducial tag may be reading the pre-stored fiducial tag location information corresponding to the preset fiducial tag from preset map information. The map information may be preset in the mobile carrier or the server.

In some embodiments, in a case that the mobile carrier senses the preset fiducial tag, current estimated location information of the mobile carrier is obtained according to movement sensing information, and the pre-stored fiducial tag location information corresponding to the preset fiducial tag is obtained according to the current estimated location information. As an option, pre-stored fiducial tag location information of a fiducial tag closest to the current estimated location information is read from the preset map information according to the current estimated location information.

In some embodiments, in a case that the mobile carrier senses the preset fiducial tag, fiducial tag spacing information and the number of sensed preset fiducial tags that have been passed are obtained, and the pre-stored fiducial tag location information corresponding to the preset fiducial tag is obtained according to the spacing information and the number of preset fiducial tags. As an option, location information of the sensed preset fiducial tags may be calculated according to the spacing information and the number of preset fiducial tags, and then the pre-stored fiducial tag location information corresponding to the location information is read from the preset map information.

It is to be understood that the spacing information of the fiducial tags pre-stored in the mobile carrier is not limited to the spacing value of the adjacent fiducial tags, but can also be a multiple of the spacing value or other related information.

In some embodiments, in a case that the mobile carrier senses the preset fiducial tag, the pre-stored fiducial tag location information corresponding to the preset fiducial tag is obtained according to at least one piece of feature information of the preset fiducial tag and current estimated location information of the mobile carrier.

In some embodiments, in response to sensing the preset fiducial tag, fiducial tag spacing information corresponding to the at least one piece of feature information is obtained from multiple pieces of pre-stored fiducial tag spacing information according to the at least one piece of feature information of the preset fiducial tag, and the pre-stored fiducial tag location information corresponding to the preset fiducial tag is obtained according to the corresponding fiducial tag spacing information and the current estimated location information of the mobile carrier.

The feature information of the preset fiducial tag may be working area type information, which may be represented by image feature information of the fiducial tag (e.g., an intersection or cross-tag image captured by the imaging apparatus for representing the fiducial tag). It is to be understood that the working area type information may also be represented by other feature information of the fiducial tag, and the feature information of the preset fiducial tag may also be other classification information other than the working area type information.

In some embodiments, in response to sensing the preset fiducial tag, a fiducial tag spacing value of the working area corresponding to the preset fiducial tag is determined from the stored fiducial tag spacing values of the at least two working areas, and the current location information is obtained according to the determined fiducial tag spacing value. The fiducial tag spacing values of at least two working areas may not be exactly the same, or the fiducial tag spacing values of at least two working areas may be the same.

In a specific example, the mobile carrier moves in a first area and a second area, different fiducial tags are used in the two areas, and the spacing value of each pair of adjacent fiducial tags in each area is the same. For example, the first area may be the public area as described above, the fiducial tags in this area are intersections of the guide trajectory body in the public area and each guide trajectory body in the roadway area. The spacing value of adjacent fiducial tags is P1 meters. The second area may be the roadway area as described above, the fiducial tags in this area are cross tags arranged at intervals on the guide trajectory body. The spacing value of the adjacent fiducial tags is P2 meters, and P1 is not equal to P2. It is to be understood that, in other examples, the first area and the second area may also be different sub-areas in the public area or the roadway area. The spacing information of adjacent fiducial tags pre-stored in the mobile carrier may include spacing values P1 and P2, and the corresponding relationships between the two spacing values and the first area and the second area. During the movement of the mobile carrier along the guide trajectory body, in a case that the imaging apparatus captures a fiducial tag, the mobile carrier may know whether it is currently in the public area or the roadway area by determining whether the fiducial tag is an intersection or a cross tag, and determine a spacing value corresponding to the fiducial tag. Moreover, the sensed number of preset fiducial tags that have been passed is obtained, location information of the sensed preset fiducial tags is calculated according to the determined spacing value and the number of preset fiducial tags that have been passed, and then the pre-stored fiducial tag location information corresponding to the location information is read from the preset map information.

It is to be understood that the example above may be extended to a scenario where the mobile carrier moves in more than two areas, and the correction of the current location estimation information and the accurate navigation of the mobile carrier may also be realized.

In some embodiments, obtaining the current location information of the mobile carrier according to the pre-stored fiducial tag location information may eliminate the deviation in the current estimated location information, and iterate the current location information with the information with the deviation eliminated Eliminating the deviation in the current estimated information may include, for example, at least one of replacing the corresponding data in the current estimated location information with the pre-stored fiducial tag location information, and taking an operation result obtained by performing a predetermined operation on the pre-stored fiducial tag location information as the current location information of the mobile carrier.

As a specific implementation of the operation result obtained by performing a predetermined operation on the pre-stored fiducial tag location information, in a case that the imaging apparatus of the mobile carrier senses the fiducial tag (indicating that the mobile carrier moves to the vicinity of the fiducial tag at this time), the current estimated location information X2 of the mobile carrier at the current moment is calculated according to the movement sensing information and the origin of the mobile carrier. In addition, the mobile carrier obtains the pre-stored fiducial tag location information X1 corresponding to the fiducial tag from the pre-stored map data, and the mobile carrier also obtains a deviation ΔX1 between its own location and the fiducial tag according to the image captured by the imaging apparatus, obtains an image-based mobile carrier location X3 according to ΔX1 and X1, and fuses X1, X2, and X3 according to a predetermined method (for example, weighted averaging), to obtain current location information X4 of the mobile carrier. It is to be understood that, in this application, the method in this example may be repeatedly executed at preset intervals to continuously correct the current estimated location information X2 of the mobile carrier at the current moment.

It is to be understood that, in some embodiments, the preset guide trajectory body may include at least one of a light-emitting strip and a color strip. The preset guide trajectory body may include at least one of continuous trajectories and discontinuous trajectories. The preset guide trajectory bodies may not be exactly the same or be exactly the same. The preset guide trajectory body may be a color strip of the same color or a color strip of different colors alternately arranged.

In some embodiments, the preset fiducial tags may be some or all of graphics, color change boundaries, and other tags such as symbols, characters, figures, colors, and the like.

In some embodiments, the preset fiducial tags are not unique, for example, each preset fiducial tag may be at least one of a same graphic tag (for example, the intersection in the public area as shown in FIG. 4, the cross tag in the roadway area, etc.), a color change boundary (fiducial tags in the roadway area as shown in FIG. 5), and the same other tags.

In other embodiments, each preset fiducial tag may also be unique, for example, the preset fiducial tag may include identification information that distinguishes the tag from other tags.

In some embodiments of this application, correcting the current estimated location information with the preset fiducial tag may eliminate a progressive error in the current estimated location information at the fiducial tag, so that the location information of the mobile carrier obtained by the server may be more accurate, and therefore the navigation accuracy may be improved.

Figure 7:
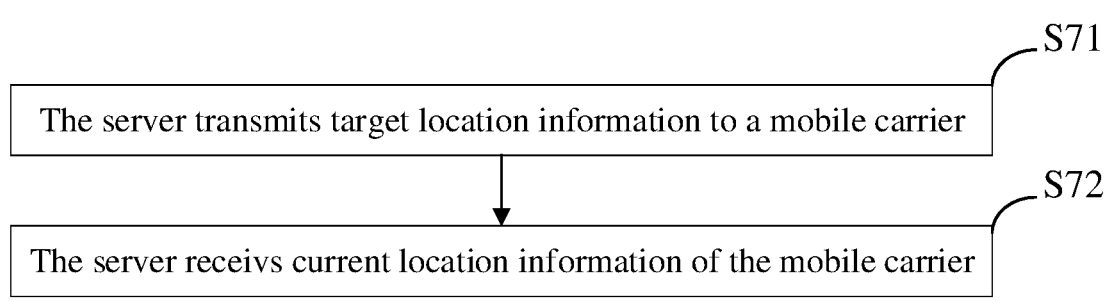
FIG. 7 is a schematic flowchart of a navigation method according to another embodiment of this application.

FIG. 7 is a schematic flowchart of a navigation method, executed by a server, according to another embodiment of this application. Referring to FIG. 7, the method of this embodiment includes the following operations:

S71: The server transmits target location information to a mobile carrier.

S72: The server receives current location information of the mobile carrier.

In an implementation, the receiving current location information of the mobile carrier further includes:
receiving preset fiducial tag related information transmitted by the mobile carrier;
obtaining pre-stored fiducial tag location information corresponding to the preset fiducial tag; and
transmitting the pre-stored fiducial tag location information to the mobile carrier.

In this application, the pre-stored fiducial tag location information may be coordinate data of fiducial tags in pre-stored map data, or relative location relationship data with other places in pre-stored map data, and the like. The obtaining pre-stored fiducial tag location information corresponding to the preset fiducial tag may be reading the pre-stored fiducial tag location information corresponding to the preset fiducial tag from preset map information.

As an option, the preset fiducial tag related information includes the current estimated location information of the mobile carrier.

The obtaining pre-stored fiducial tag location information corresponding to the preset fiducial tag includes: obtaining the pre-stored fiducial tag location information corresponding to the current estimated location information.

Pre-stored fiducial tag location information of a fiducial tag closest to the current estimated location information is read from the preset map information according to the current estimated location information.

As an option, the preset fiducial tag related information includes a number of preset fiducial tags that the mobile carrier has passed.

The obtaining pre-stored fiducial tag location information corresponding to the preset fiducial tag includes: obtaining fiducial tag spacing information, and obtaining, according to the fiducial tag spacing information and the number of preset fiducial tags, the pre-stored fiducial tag location information corresponding to the preset fiducial tag.

As an option, the preset fiducial tag related information includes the current estimated location information of the mobile carrier.

The obtaining pre-stored fiducial tag location information corresponding to the preset fiducial tag includes: obtaining at least one piece of feature information of the preset fiducial tag, and obtaining corresponding pre-stored fiducial tag location information according to the current estimated location information and the at least one piece of feature information.

As an option, the preset fiducial tag related information includes a type of the preset fiducial tag and a number of preset fiducial tags that the mobile carrier has passed.

The obtaining pre-stored fiducial tag location information corresponding to the preset fiducial tag includes: determining fiducial tag spacing information according to the type of the preset fiducial tag, and obtaining, according to the spacing information and the number of preset fiducial tags, the pre-stored fiducial tag location information corresponding to the preset fiducial tag.

For the features mentioned in this embodiment, reference may be made to the relevant descriptions in the previous embodiments, and details are not described here.

Figure 8:
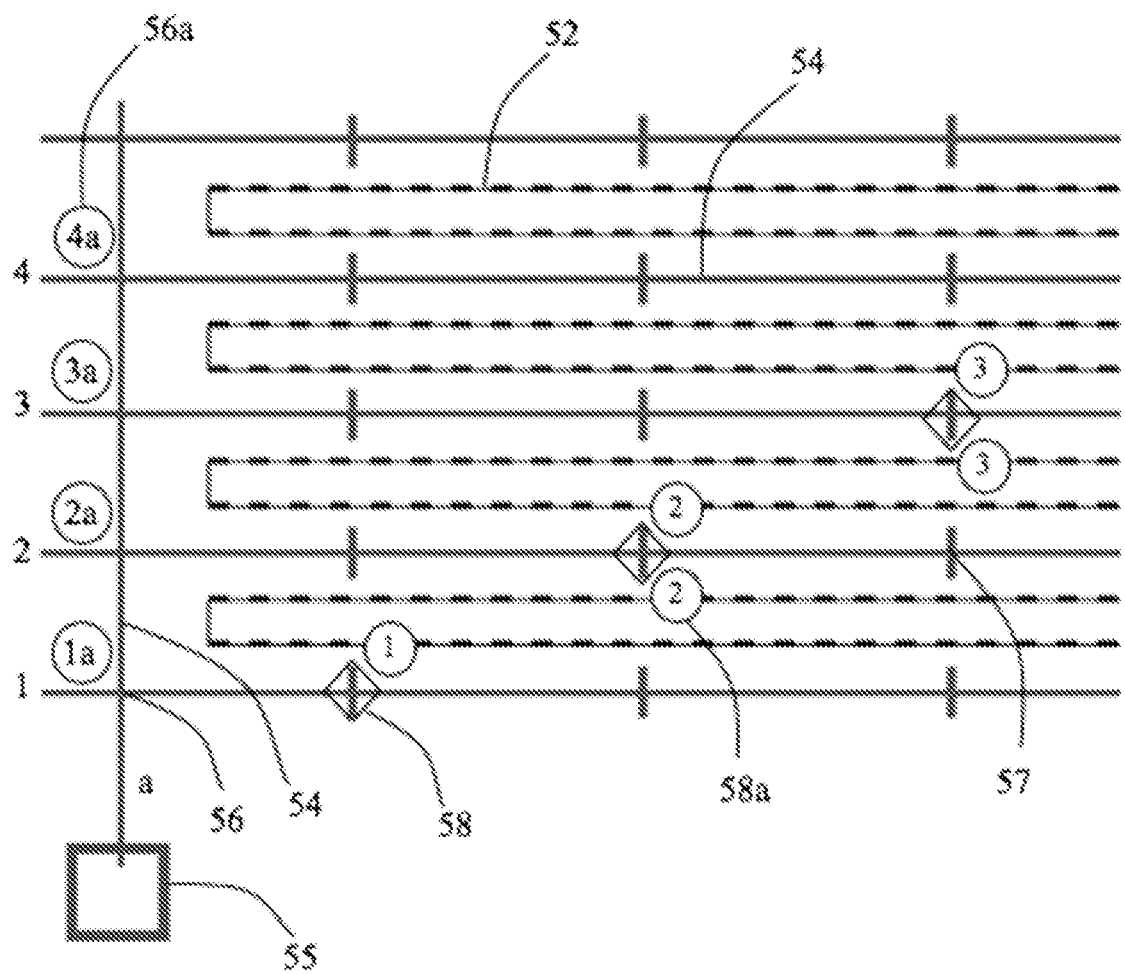
FIG. 8 is a schematic diagram of arrangement of a guide trajectory body and a positioning tag on a warehouse floor according to an embodiment of this application.
Figure 9:
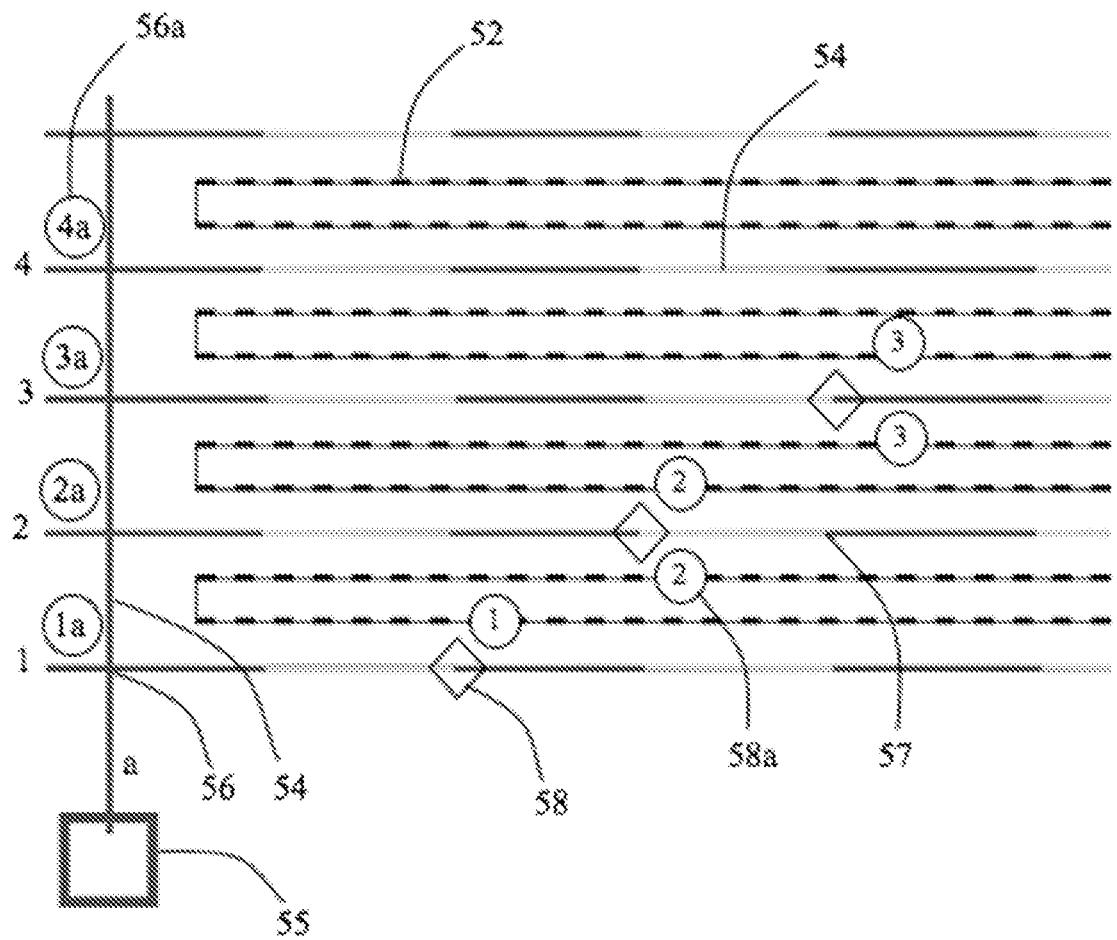
FIG. 9 is a schematic diagram of arrangement of a guide trajectory body and a positioning tag on a warehouse floor according to another embodiment of this application.

FIG. 8 and FIG. 9 are schematic diagrams of arrangements of a guide trajectory body and a positioning tag on a warehouse floor according to other embodiments of this application. The positioning tag includes a fiducial tag, a reference tag, and an initialization tag, etc.

The arrangement of FIG. 8 is similar to that of FIG. 4, and the difference is that, in FIG. 8, a reference tag 56a is added near each fiducial tag 56 in the public area, and at least one initialization tag 58 is added on each guide trajectory body 54 in the roadway area, and at least one reference tag 58a is provided near each initialization tag 58. In some embodiments, initialization tags are provided at some of the fiducial tags of each guide trajectory body. For example, each guide trajectory body may be correspondingly provided with one or more initialization tags. One or more reference tags may be provided near each initialization tag. In a case of providing a plurality of reference tags, the plurality of reference tags may be the same as shown in FIG. 8 and FIG. 9, and it is to be understood that the plurality of reference tags may also be different.

The arrangement of FIG. 9 is similar to that of FIG. 5, and the difference is that, like FIG. 8, in the embodiment of FIG. 9, a reference tag 56a a is added near each fiducial tag 56 in the public area, and an initialization tag 58 and a reference tag 58a are added on each guide trajectory body 54 in the roadway area based on FIG. 5.

In some embodiments, the initialization tags 58 are the same, and the reference tags 58a corresponding to the initialization tags are different, which may be understood, and this application is not limited thereto.

In some embodiments, the initialization tag 58 is provided near the selected fiducial tag 57 and overlaps with the preset guide trajectory body 54, and may be recognized by the mobile carrier or manually. For example, in FIG. 8 and FIG. 9, the initialization tag 58 is a square tag around the fiducial tag 57. It is to be understood that, in other embodiments, the initialization tag 58 is a tag of other shapes around the fiducial tag, such as round and triangular, or the initialization tag 58 may be provided at other nearby location of the fiducial tag.

It is to be understood that the initialization tag 58 may also be provided at other locations in the roadway area. For example, it may be provided at a location that is not a fiducial tag on the guide trajectory body 54, or at a location outside the guide trajectory body that does not overlap with the guide trajectory body.

Figure 10:
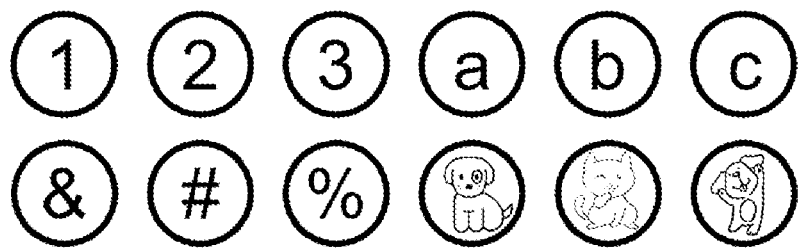
FIG. 10 exemplarily shows some reference tags provided by embodiments of this application.

In some embodiments, the reference tag 56 of the public area is composed of an identification of the guide trajectory body 54 in the public area and an identification of each guide trajectory body of the roadway area. For example, in FIG. 8 and FIG. 9, an identification of a guide trajectory body 54 in a left public area is "a", and identifications of guide trajectory bodies in the roadway area from bottom to top are "1", "2", "3", and "4", respectively. In this way, reference tags 56a "(1a)", "(2a)", "(3a)", and "(4a)" may be provided in the vicinity of each fiducial tag 56 formed by the intersection of the guide trajectory body in the public area and each guide trajectory body in the roadway area, respectively. The reference tag 58a of the initialization tag 58 corresponding to each guide trajectory body in the roadway area may be the identification of each guide trajectory body, such as "①", "②", "③", and "④". It is to be understood that, this application is not limited thereto, and each reference tag may also use other tags such as graphics, characters, barcodes, QR codes, etc. recognizable by the mobile carrier, for example, the tags as shown in the example of FIG. 10 may be used. For example, the reference tag may be provided on the shelf adjacent to the guide trajectory body, may be provided on one side of the guide trajectory body, or may be provided on both sides of the guide trajectory body.

Figure 11:
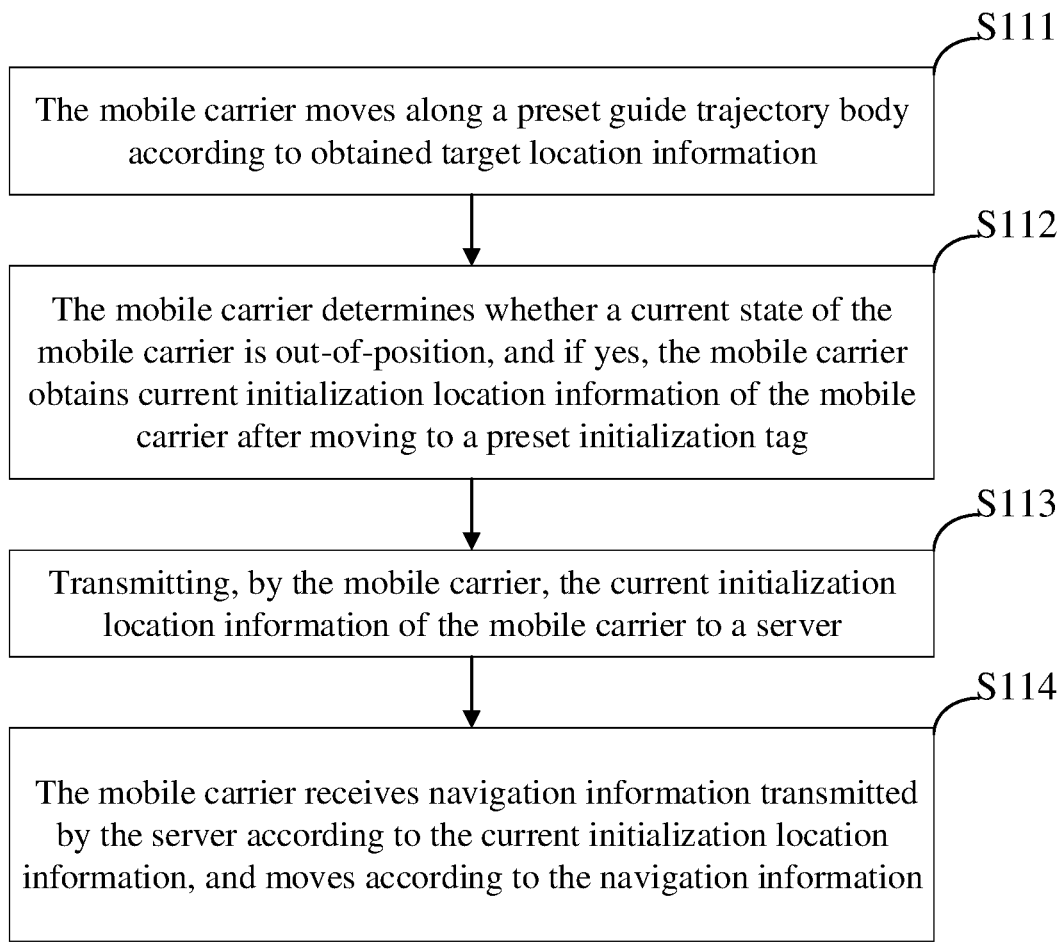
FIG. 11 is a flowchart of a navigation method according to another embodiment of this application.

FIG. 11 is a flowchart of a navigation method, executed by a mobile carrier, according to another embodiment of this application. Referring to FIG. 11, the method according to this embodiment includes the following operations:

S111: The mobile carrier moves along a preset guide trajectory body according to obtained target location information.

The target location information may be transmitted by the server.

It is to be understood that, the movement along the preset guide trajectory body may be realized with reference to the relevant content of S61 in the previous embodiment, and details are not described here.

S112: The mobile carrier Determines whether a current state of the mobile carrier is out-of-position, and if yes, the mobile carrier obtains current initialization location information of the mobile carrier after moving to a preset initialization tag.

In this application, the mobile carrier performs an initialization program after charging, for example, in the initial location area. After the initialization program is executed, in response to determining that the current state of the mobile carrier is out-of-position, the mobile carrier may perform re-initialization.

In some embodiments, the mobile carrier is equipped with a first imaging apparatus and a second imaging apparatus, where the first imaging apparatus faces the ground and the second imaging apparatus is configured to face a direction along which the second imaging apparatus could scan the reference tag. In a case that the first imaging apparatus scans a preset calibration tag, it is determined whether the second imaging apparatus senses a first reference tag, and if yes, it is determined that the current state is not out-of-position, so that the mobile carrier continues to move along the preset guide trajectory body, and if not, it is determined that the current state is out-of-position, and the mobile carrier is triggered to re-initialize.

In other embodiments, the mobile carrier is equipped with a first imaging apparatus and a second imaging apparatus, where the first imaging apparatus faces the ground and the second imaging apparatus is configured to face a direction that the second imaging apparatus could scan the reference tag. In a case that the first imaging apparatus scans the preset calibration tag, the second imaging apparatus scans a first reference tag corresponding to the preset calibration tag to generate first imaging information, and it is determined that whether the first reference tag corresponds to the preset calibration tag according to the first imaging information, and if yes, the mobile carrier continues to move along the preset guide trajectory body, and if not, it is determined that the mobile carrier is in an out-of-position state, and the mobile carrier is triggered to re-initialize. It is to be understood that, the correspondence referred to in this application includes the case where the difference between the first reference tag and the preset calibration tag is within a preset range.

In a specific implementation, in a case that the first imaging apparatus scans the preset calibration tag, the mobile carrier may obtain its current initialization location information. In addition, the mobile carrier may also obtain the pre-stored location information of the first reference tag according to the first imaging information. Whether the first reference tag corresponds to the preset calibration tag may be determined by determining the current initialization location information and the pre-stored location information of the first reference tag.

It is to be understood that, the current initialization location information of the mobile carrier may be obtained with reference to the relevant descriptions in the previous embodiments, and details are not described here.

In other embodiments, in a case that the mobile carrier moves to a location estimated to have a preset calibration tag, whether the imaging apparatus senses the preset calibration tag is determined, and if not, it is determined that the current state of the mobile carrier is out-of-position.

In a specific implementation, the mobile carrier may, for example, obtain its current initialization location information based on a preset interval, and compares the current initialization location information with the pre-stored map data to determine whether to move to a location estimated to have a preset calibration tag. The pre-stored map data may include the location information of each preset calibration tag.

In other embodiments, in a case that the mobile carrier moves to a location estimated to have a preset calibration tag, it is determined whether the preset calibration tag is sensed and the sensed preset calibration tag corresponds to the location, and if not, it is determined that the current state of the mobile carrier is out-of-position.

In a specific implementation, each preset calibration tag is unique. The mobile carrier may, for example, obtain its current initialization location information based on a preset interval, and compares the current initialization location information with the pre-stored map data to determine whether to move to a location estimated to have a preset calibration tag. The pre-stored map data may include identification information and corresponding location information of each preset calibration tag. If the determination result is yes, it is determined whether the imaging apparatus senses the preset calibration tag, and if yes, location information of the preset calibration tag is obtained from the pre-stored map data, and it is determined whether the location information of the preset calibration tag corresponds to the current initialization location information of the mobile carrier, and if not, it is determined that the mobile carrier is in the out-of-position state.

In other embodiments, in a case that the mobile carrier senses the preset calibration tag twice in a row during the movement, and no first reference tag is sensed or the sensed first reference tag does not correspond to the sensed preset calibration tag, it is determined that the current state of the mobile carrier is out-of-position.

In other embodiments, in a case that the mobile carrier reaches a location estimated to have a preset calibration tag twice in a row during the movement, and no preset calibration tag is sensed or the sensed preset calibration tag does not correspond to the location, the current state of the mobile carrier is out-of-position.

In this application, the preset calibration tag may be the previous fiducial tag. It is to be understood that, this application is not limited thereto. For example, the preset calibration tag may also be a tag additionally provided other than the fiducial tag.

The location information of each reference tag in the warehouse may be pre-stored in the mobile carrier.

In this application, in response to determining that the current state is out-of-position, the mobile carrier moves to the preset initialization tag.

In some embodiments, in a case that the mobile carrier determines that the current state is out-of-position, the mobile carrier stops moving, and transmits an error notification to the server. After receiving the error notification, the server transmits a control command to the mobile carrier in response to the error notification. After the mobile carrier receives the control command of the server, the mobile carrier moves to the preset initialization tag along the guide trajectory body according to the control command After the first imaging apparatus of the mobile carrier scans the preset initialization tag, the second imaging apparatus attempts to scan a second reference tag corresponding to the preset initialization tag. In response to scanning the second reference tag, second imaging information is generated, and then the current initialization location information of the mobile carrier is obtained and transmitted to the server according to the second imaging information. In a case that the second imaging apparatus does not scan the second reference tag, prompt information is generated, and maintenance personnel may manually input the current location of the mobile carrier on the mobile carrier according to the prompt information. The mobile carrier transmits the manually inputted current initialization location information to the server. The current initialization location information may include second reference tag related information, such as identification information of the second reference tag and corresponding location information of the second reference tag.

In this application, the second reference tag and the first reference tag may be different, and may also be the same.

In other embodiments, in response to determining that the current state is out-of-position, the mobile carrier transmits an error notification to the server. After receiving the error notification, the server transmits a stop command to the mobile carrier in response to the error notification. On the other hand, the server also transmits a maintenance notification to a user terminal of the maintenance personnel. The maintenance notification may include at least one of identification information and location-related information of the mobile carrier in error, so that the maintenance personnel reaches the mobile carrier in error. After the mobile carrier receives the stop command of the server, the mobile carrier stops according to the stop command After the maintenance personnel arrives at the mobile carrier in error, the mobile carrier is moved to a nearby preset initialization tag. After the first imaging apparatus of the mobile carrier scans the preset initialization tag, the second imaging apparatus attempts to scan a second reference tag corresponding to the preset initialization tag. In response to the second imaging apparatus scanning the second reference tag, the second imaging information is generated, and then the current initialization location information of the mobile carrier is obtained and transmitted to the server according to the second imaging information. In a case that the second imaging apparatus does not scan the second reference tag, prompt information is generated, and the maintenance personnel may manually input the current location of the mobile carrier on the mobile carrier according to the prompt information. The mobile carrier transmits the manually inputted current initialization location information to the server. The current initialization location information may include second reference tag related information, such as identification information of the second reference tag and corresponding location information of the second reference tag. It is to be understood that, after determining that the current state is out-of-position, the mobile carrier may also stop moving, without being controlled by the server to stop moving.

In other embodiments, in a case that the mobile carrier determines that a re-initialization trigger condition is satisfied, the mobile carrier moves to the preset initialization tag along the guide trajectory body, and transmits an error notification to the server. After receiving the error notification, the server transmits a maintenance notification to the user terminal of the maintenance personnel in response to the error notification. The maintenance notification may include at least one of identification information and location-related information of the mobile carrier in error, so that the maintenance personnel reaches the mobile carrier in error. After the first imaging apparatus of the mobile carrier scans the preset initialization tag, the second imaging apparatus attempts to scan a second reference tag corresponding to the preset initialization tag. In response to the second imaging apparatus scanning the second reference tag, the second imaging information is generated, and then the current initialization location information of the mobile carrier is obtained and transmitted to the server according to the second imaging information. In a case that the second imaging apparatus does not scan the second reference tag, prompt information is generated, and the maintenance personnel may manually input the current location of the mobile carrier on the mobile carrier according to the prompt information. The mobile carrier transmits the manually inputted current initialization location information to the server. The current initialization location information may include second reference tag related information, such as identification information of the second reference tag and corresponding location information of the second reference tag.

In other embodiments, in a case that the mobile carrier determines that the current state is out-of-position, the mobile carrier moves to the preset calibration tag along the guide trajectory body, and transmits the error notification to the server. The error notification includes location related information of the mobile carrier. After receiving the error notification, the server transmits a maintenance notification to the user terminal of the maintenance personnel in response to the error notification. The maintenance notification may include at least one of identification information and location-related information of the mobile carrier in error, so that the maintenance personnel reaches the mobile carrier in error and moves the mobile carrier to the preset initialization tag. After the first imaging apparatus of the mobile carrier scans the preset initialization tag, the second imaging apparatus attempts to scan a second reference tag corresponding to the initialization tag. In response to the second imaging apparatus scanning the second reference tag, the second imaging information is generated, and then the current initialization location information of the mobile carrier is obtained and transmitted to the server according to the second imaging information. In a case that the second imaging apparatus does not scan the second reference tag, prompt information is generated, and the maintenance personnel may manually input the current location of the mobile carrier on the mobile carrier according to the prompt information. The mobile carrier transmits the manually inputted current initialization location information to the server. The current initialization location information may include second reference tag related information, such as identification information of the second reference tag and corresponding location information of the second reference tag.

It is to be understood that, in other embodiments, the maintenance personnel may manually input the current location of the mobile carrier on other terminals according to the prompt information, and the other terminals transmits the manually inputted current initialization location information to the server.

In an implementation, the location information of the calibration tag is not stored in the mobile carrier, and the location related information of the mobile carrier included in the error notification transmitted by the mobile carrier may be the current initialization location information of the mobile carrier. The current initialization location information of the mobile carrier may be obtained with reference to the relevant descriptions in the previous embodiments, and details are not described here.

In another implementation, the location information of each calibration tag, such as coordinate data of each calibration tag and relative location relationship data with other places, is stored in the mobile carrier. The location related information of the mobile carrier included in the error notification transmitted by the mobile carrier may be the location information of the calibration tag.

S113: The mobile carrier transmits the current initialization location information of the mobile carrier to a server.

In response to determining that the mobile carrier is in the out-of-position state, after obtaining the current initialization location information of the mobile carrier, the mobile carrier transmits the current initialization location information of the mobile carrier to the server.

In some embodiments, the current initialization location information transmitted by the mobile carrier to the server may include second reference tag related information corresponding to the preset initialization tag, such as at least one of identification information of the second reference tag and corresponding location information of the second reference tag, and the like.

S114: The mobile carrier receives navigation information transmitted by the server according to the current initialization location information, and moves according to the navigation information.

In some embodiments, each guide trajectory body in the roadway area has only a single corresponding initialization tag, the preset initialization tags corresponding to each of the guide trajectory bodies are the same, and the reference tags corresponding to each of the guide trajectory bodies are different. After the server receives the current initialization location information transmitted by the mobile carrier, in response to determining according to the stored map information that the corresponding guide trajectory body has only a single initialization tag, the server generates the navigation information directly according to the received current initialization location information and the target location of the mobile carrier, and transmits the generated navigation information to the mobile carrier.

In some embodiments, each guide trajectory body in the roadway area is provided with two or more preset initialization tags, the two or more preset initialization tags corresponding to each of the guide trajectory bodies are the same. The two or more reference tags corresponding to one guide trajectory body are the same, and the reference tags corresponding to each of the guide trajectory bodies are different. After the server receives the identification information of the second reference tag transmitted by the mobile carrier, in response to determining according to the stored map information that the corresponding guide trajectory body has two or more initialization tags, the server determines which preset initialization tag the mobile carrier is at in the guide trajectory body according to the received identification information of the second reference tag and stored historical location information of the mobile carrier, generates the navigation information according to the determined location information of the preset initialization tag and the target location of the mobile carrier, and transmits the generated navigation information to the mobile carrier.

In some embodiments, the navigation information generated by the server includes steering information. For example, in a case that the server determines that the mobile carrier is in the public area and needs to turn left or right to the roadway area, the navigation information transmitted to the mobile carrier may include corresponding steering information. After receiving the navigation information, the mobile carrier may slow down according to the steering information and move to the center of the calibration tag, then turn left or right to the roadway area and continue to travel along the guide trajectory body.

In some embodiments, the navigation information generated by the server includes straight information. For example, in a case that the server determines that the mobile carrier is in the public area and does not reach a target roadway area, or in a case that the server determines that the mobile carrier is in the target roadway area but does not reach the location of a target shelf or cargo, the navigation information transmitted to the mobile carrier may include straight information.

It is to be understood that the embodiment method in FIG. 11 may be combined with the navigation method corresponding to previous FIG. 6. In this way, in a case that the mobile carrier operates according to the method of FIG. 6, if an error occurs due to out-of-position or other reasons, re-initialization may be performed according to the foregoing method, to ensure reliable operation of the mobile carrier.

An embodiment of this application further provides a navigation method, executed by a server, including the following operations:

S121: The server transmits target location information to a mobile carrier.

S122: The server receives an error notification transmitted by the mobile carrier.

S123: The server Transmits a control command to at least one of the mobile carrier and a user terminal, so that the mobile carrier moves to a preset initialization tag.

In some embodiments, the error notification includes location related information of the mobile carrier. The control command transmitted to the user terminal is a maintenance notification that includes the location related information.

In some embodiments, the method further includes:
receiving current initialization location information of the mobile carrier, the current initialization location information corresponding to the preset initialization tag; and
transmitting navigation information generated according to the current initialization location information to the mobile carrier.

It is to be understood that, the features mentioned in the embodiment of the method executed by the server, reference may be made to the relevant descriptions in the previous embodiments, and details are not described here.

Figure 12:
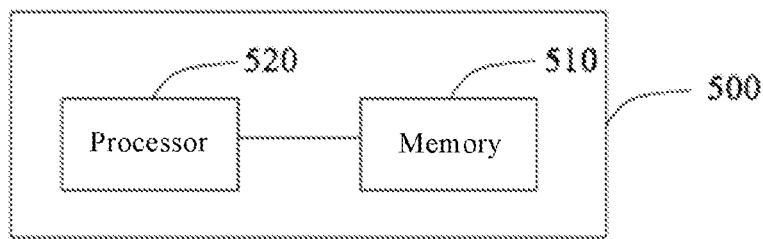
FIG. 12 is a schematic structural diagram of a navigation apparatus according to an embodiment of this application.

FIG. 12 is a schematic structural diagram of a navigation apparatus according to an exemplary embodiment of this application. The navigation apparatus 500 includes: at least one processor 520 and a memory 510 in communication connection with the at least one processor 520. The memory 510 stores executable codes. The executable codes, when executed by the at least one processor 520, cause the at least one processor 520 to execute some or all steps in the method above.

The processor 520 may be a Central Processing Unit (CPU), and may also be other general-purpose processors, a Digital Signal Processor (DSP), an Application Specific Integrated Circuit (ASIC), a Field-Programmable Gate Array (FPGA), or other programmable logic devices, discrete gates or transistor logic devices, and discrete hardware components, etc. The general-purpose processor may be a microprocessor or the processor may also be any conventional processor, etc.

The memory 510 may include various types of storage units, such as a system internal memory, a Read Only Memory (ROM), and a permanent storage apparatus. The ROM may store static data or instructions required by the processor 520 or other modules of the computer. The permanent storage apparatus may be a readable and writable storage apparatus. The permanent storage apparatus may be a non-volatile storage device that does not lose stored instructions and data even if the computer is powered off. In some embodiments, the permanent storage apparatus employs a mass storage apparatus (e.g., a magnetic or optical disk, a flash memory) as the permanent storage apparatus. In other embodiments, the permanent storage apparatus may be a removable storage device (e.g., a floppy disk, an optical drive). The system internal memory may be a readable and writable storage device or a volatile readable and writable storage device, such as a dynamic random access internal memory. The system internal memory may store some or all of the instructions and data that the processor requires at runtime. In addition, the memory 510 may include any combination of computer-readable storage media, including various types of semiconductor memory chips (DRAM, SRAM, SDRAM, flash memory, programmable read-only memory), and magnetic and/or optical disks may also be employed. In some embodiments, the memory 510 may include a removable storage device that is readable and/or writable, such as a Compact Disk (CD), a read-only digital versatile disk (e.g., DVD-ROM, dual-layer DVD-ROM), read-only Blu-ray disks, ultra-density disks, flash cards (e.g., SD card, min SD card, Micro-SD card, etc.), and magnetic floppy disks, etc. The computer readable storage media do not contain carrier waves and transient electronic signals transmitted in a wireless or wired manner.

The embodiment of this application also provides a non-volatile computer storage medium storing computer executable instructions. The computer executable instructions, when executed by one or more processors, cause the one or more processors to execute the navigation method in the embodiments of any method.

The embodiment of this application also provides a computer program product. The computer program product includes computer programs stored in a non-volatile computer readable storage medium. The computer programs include program instructions. The program instructions, when executed by the mobile carrier, cause the mobile carrier to execute any navigation method. The program instructions, when executed by the server, cause the server to execute any navigation method.

The apparatus or device embodiments as described above are merely illustrative. Unit modules described as separate components may or may not be physically separated, and the components displayed as module units may or may not be physical units, and may be located in one place or may be distributed over a plurality of network module units. Some or all of the modules may be selected based on actual needs to achieve the objectives of the solutions of this embodiment.

Through the description of the above embodiments, those skilled in the art can clearly understand that the embodiments may be implemented by virtue of software and the general hardware platform, and certainly may also be implemented by hardware. Based on such an understanding, the technical solution o above essentially or the part that contributes to the existing technology can be embodied in the form of a software product, and the computer software product is stored in a computer readable storage medium (such as an ROM/RAM, a magnetic disk, an optical disk), including several instructions that cause a computer device (which may be a personal computer, a processing terminal, or a network device, etc.) to execute the method described in various embodiments or some of the embodiments.

A person of ordinary skill in the art may understand that all or some of the steps of the foregoing method embodiments may be implemented by hardware related to the program instruction. The foregoing program may be stored in a computer readable storage medium. When the program is executed, the steps including the above method embodiments are executed. The foregoing storage media include: ROMs, RAMs, magnetic disks or optical disks and other media that may store program codes.

Finally, the foregoing embodiments are only used for describing the technical solution of this application, rather than limiting. Although this application is described in detail with reference to the foregoing embodiments, those of ordinary skill in the art understand that, any person skilled in the art can still modify the technical solutions described in the foregoing embodiments, or perform equivalent replacements of some or all of the technical features. These modifications or replacements do not cause the essence of the corresponding technical solutions to deviate from the scope of the technical solutions of the embodiments of this application.

What is claimed is:

1. A navigation method, executed by a mobile carrier, the mobile carrier being equipped with a first imaging apparatus and a second imaging apparatus, the first imaging apparatus facing a ground and the second imaging apparatus being configured to face a direction along which the second imaging apparatus is capable of scanning a first reference tag;

wherein the navigation method comprises:
   moving along a preset guide trajectory body according to obtained target location information; and
   determining whether a current state of the mobile carrier is out-of-position, and in response to determining that the current state of the mobile carrier is out-of-position, obtaining current initialization location information of the mobile carrier after moving to a preset initialization tag along the preset guide trajectory body;

wherein the determining whether a current state of the mobile carrier is out-of-position comprises:
   in a case that the first imaging apparatus senses a preset calibration tag, determining whether the first reference tag corresponding to the preset calibration tag is sensed by the second imaging apparatus, and in response to determining that the first reference tag is not sensed, determining that the current state of the mobile carrier is out-of-position;

wherein a warehouse floor is divided into a public area and a roadway area, both the public area and the roadway area are provided with the preset guide trajectory body, both the preset guide trajectory body in the public area and the preset guide trajectory body in the roadway area have a plurality of preset calibration tags, there are a guide trajectory body in the public area and there are a plurality of guide trajectory bodies in the roadway area, each guide trajectory body in the roadway area is a color strip;

wherein the plurality of preset calibration tags in the public area are formed by intersection of the guide trajectory body in the public area and the guide trajectory bodies in the roadway area, and the plurality of preset calibration tags in the roadway are formed by color change boundaries of the color strips of different colors, the plurality of preset calibration tags in the roadway area have same appearance, the plurality of preset calibration tags in the public area have same appearance, the plurality of preset calibration tags in the public area are different from the plurality of preset calibration tags in the roadway area;

wherein the preset initialization tag is set at some calibration tags among the plurality of preset calibration tags, the preset initialization tag is configured to indicate the mobile carrier to obtain the current initialization location information of the mobile carrier; and wherein each preset calibration tag corresponds to the first reference tag, first reference tags provided in different positions have different appearances.

2. The navigation method according to claim 1, further comprising:

transmitting the current initialization location information of the mobile carrier to a server; and receiving navigation information transmitted by the server according to the current initialization location information, and moving according to the navigation information.

3. The navigation method according to claim 1, wherein the moving along the preset guide trajectory body comprises:

making an imaging apparatus disposed on the mobile carrier photograph the preset guide trajectory body, and generating trajectory imaging information;

obtaining, according to the trajectory imaging information, at least one of an angle deviation between a current movement direction of the mobile carrier and the preset guide trajectory body, and a location deviation between a current location of the mobile carrier and the preset guide trajectory body; and correcting movement of the mobile carrier according to at least one of the angle deviation and the location deviation.

4. The navigation method according to claim 1, wherein after determining that the current state of the mobile carrier is out-of-position, the navigation method further comprises:

stopping moving, and transmitting an error notification to the server;

the obtaining current initialization location information of the mobile carrier after moving to the preset initialization tag along the preset guide trajectory body comprises:

receiving a control command transmitted by the server in response to the error notification, and moving to the preset initialization tag along the preset guide trajectory body according to the control command; and sensing a second reference tag corresponding to the preset initialization tag.

5. The navigation method according to claim 1, wherein after determining that the current state of the mobile carrier is out-of-position, the navigation method further comprises: transmitting an error notification to the server, and stopping moving; and the obtaining current initialization location information of the mobile carrier after moving to the preset initialization tag along the preset guide trajectory body comprises:

determining whether a start initialization instruction is received, and in response to determining that the start initialization instruction is received, sensing a second reference tag corresponding to the preset initialization tag.

6. The navigation method according to claim 1, wherein the obtaining current initialization location information of the mobile carrier comprises:

sensing a second reference tag corresponding to the preset initialization tag.

7. The navigation method according to claim 1, wherein the obtaining current initialization location information of the mobile carrier after moving to the preset initialization tag along the preset guide trajectory body comprises:

stopping after moving to the preset calibration tag along the preset guide trajectory body, and transmitting an error notification to the server; and determining whether a start initialization instruction is received, and in response to determining that the start initialization instruction is received, sensing a second reference tag corresponding to the preset initialization tag.

8. The navigation method according to claim 1, wherein the obtaining current initialization location information of the mobile carrier comprises:

determining whether a second reference tag corresponding to the preset initialization tag is sensed, and in response to determining that the second reference tag corresponding to the preset initialization tag is sensed, obtaining relevant information of the second reference tag, otherwise, obtaining the received current initialization location information.

9. The navigation method according to claim 1, wherein the preset initialization tag overlaps with the preset guide trajectory body, or the preset initialization tag does not overlap with the preset guide trajectory body.

10. The navigation method according to claim 1, wherein the preset calibration tags comprise some or all of symbols, characters, figures, colors, graphics, and color change boundaries.

11. The navigation method according to claim 4, wherein the preset initialization tag comprises a plurality of preset initialization tags, the plurality of preset initialization tags at different locations are the same, and second reference tags corresponding to the plurality of preset initialization tags at different locations indicate corresponding location information.

12. A navigation method, executed by a server, comprising:
- transmitting target location information to a mobile carrier, the mobile carrier being equipped with a first imaging apparatus and a second imaging apparatus, the first imaging apparatus facing a ground and the second imaging apparatus being configured to face a direction along which the second imaging apparatus is capable of scanning a first reference tag;
- receiving an error notification transmitted by the mobile carrier, wherein the error notification is transmitted in a case that a current state of the mobile carrier is out-of-position; and
- transmitting a control command to at least one of the mobile carrier and a user terminal, so that the mobile carrier moves to a preset initialization tag along a preset guide trajectory body
- wherein whether the current state of the mobile carrier is out-of-position is determined by:
- in a case that the first imaging apparatus senses a preset calibration tag, whether the first reference tag corresponding to the preset calibration tag is sensed by the second imaging apparatus is determined, and in response to the first reference tag being not sensed, the current state of the mobile carrier is out-of-position is determined;
- wherein a warehouse floor is divided into a public area and a roadway area, both the public area and the roadway area are provided with the preset guide trajectory body, both the preset guide trajectory body in the public area and the preset guide trajectory body in the roadway area have a plurality of preset calibration tags, there is a guide trajectory body in the public area, and there are a plurality of guide trajectory bodies in the roadway area comprises, each guide trajectory body in the roadway area is a color strip;
- wherein the plurality of preset calibration tags in the public area are formed by intersections of the guide trajectory body in the public area and the guide trajectory bodies in the roadway area, and the preset calibration tags in the roadway area are formed by color change boundaries of the color strip of different colors, the plurality of preset calibration tags in the roadway area have same appearance, the plurality of preset calibration tags in the public area have same appearance, the plurality of preset calibration tags in the public area are different from the plurality of preset calibration tags in the roadway area;
- wherein the preset initialization tag is set at some calibration tags among the plurality of preset calibration tags, the preset initialization tag is configured to indicate the mobile carrier to obtain the current initialization location information of the mobile carrier; and
- wherein each preset calibration tag corresponds to the first reference tag first reference tags provided in different positions have different appearances.

13. The navigation method according to claim 12, wherein
- the error notification comprises location related information of the mobile carrier; and
- the control command transmitted to the user terminal is a maintenance notification that comprises the location related information.

14. The navigation method according to claim 12, further comprising:
- receiving current initialization location information of the mobile carrier, the current initialization location information corresponding to the preset initialization tag; and
- transmitting navigation information generated according to the current initialization location information to the mobile carrier.

15. A navigation apparatus, comprising:
- at least one processor; and
- at least one memory in communication connection with the at least one processor, wherein the at least one memory stores executable codes, and the executable codes, when executed by the at least one processor, cause the at least one processor to execute operations of:
- controlling a mobile carrier to move along a preset guide trajectory body according to obtained target location information; and determining whether a current state of the mobile carrier is out-of-position, and in response to determining that the current state of the mobile carrier is out-of-position, obtaining current initialization location information of the mobile carrier after moving to a preset initialization tag along the preset guide trajectory body; or
- transmitting target location information to the mobile carrier, receiving an error notification transmitted by the mobile carrier, wherein the error notification is transmitted in a case that the current state of the mobile carrier is out-of-position; and transmitting a control command to at least one of the mobile carrier and a user terminal, so that the mobile carrier moves to the preset initialization tag along the preset guide trajectory body;
- wherein the mobile carrier is equipped with a first imaging apparatus and a second imaging apparatus, the first imaging apparatus facing a ground and the second imaging apparatus being configured to face a direction along which the second imaging apparatus is capable of scanning a first reference tag;
- wherein the current state of the mobile carrier is out-of-position is determined by:
- in a case that the first imaging apparatus senses a preset calibration tag, whether the first reference tag corresponding to the preset calibration tag is sensed by the second imaging apparatus is determined, and in response to the first reference tag being not sensed, the current state of the mobile carrier is out-of-position is determined;
- wherein a warehouse floor is divided into a public area and a roadway area, both the public area and the roadway area are provided with the preset guide trajectory body, both the preset guide trajectory body in the public area and the preset guide trajectory body in the roadway area have a plurality of preset calibration tags, there is a guide trajectory body in the public area, and there are a plurality of guide trajectory bodies in the roadway area comprises, each guide trajectory body in the roadway area is a color strip;
- wherein the plurality of preset calibration tags in the public area are formed by intersections of the guide trajectory body in the public area and the plurality of guide trajectory bodies in the roadway area, and the preset calibration tags in the roadway area are formed by color change boundaries of the color strip of different colors, the plurality of preset calibration tags in the roadway area have same appearance, the plurality of preset calibration tags in the public area have same appearance, the plurality of preset calibration tags in the public area are different from the plurality of preset calibration tags in the roadway area;

wherein the preset initialization tag is set at some calibration tags among the plurality of preset calibration tags, the preset initialization tag is configured to indicate the mobile carrier to obtain the current initialization location information of the mobile carrier; and wherein each preset calibration tag corresponds to the first reference tag first reference tags provided in different positions have different appearances.

16. A non-transitory computer-readable storage medium, storing computer executable instructions, the computer executable instructions, when executed by a processor, cause the processor to execute operations of:

controlling a mobile carrier to move along a preset guide trajectory body according to obtained target location information; and determining whether a current state of the mobile carrier is out-of-position, and in response to determining that the current state of the mobile carrier is out-of-position, obtaining current initialization location information of the mobile carrier after moving to a preset initialization tag along the preset guide trajectory body; or transmitting target location information to the mobile carrier, receiving an error notification transmitted by the mobile carrier, wherein the error notification is transmitted in a case that the current state of the mobile carrier is out-of-position; and transmitting a control command to at least one of the mobile carrier and a user terminal, so that the mobile carrier moves to the preset initialization tag along the preset guide trajectory body;

wherein the mobile carrier is equipped with a first imaging apparatus and a second imaging apparatus, the first imaging apparatus facing a ground and the second imaging apparatus being configured to face a direction along which the second imaging apparatus is capable of scanning a first reference tag;

wherein the current state of the mobile carrier is out-of-position is determined by:

in a case that the first imaging apparatus senses a preset calibration tag, whether the first reference tag corresponding to the preset calibration tag is sensed by the second imaging apparatus is determined, and in response to the first reference tag being not sensed, the current state of the mobile carrier is out-of-position is determined;

wherein a warehouse floor is divided into a public area and a roadway area, both the public area and the roadway area are provided with the preset guide trajectory body, both the preset guide trajectory body in the public area and the preset guide trajectory body in the roadway area have a plurality of preset calibration tags, there are a guide trajectory body in the public area, and there are a plurality of guide trajectory bodies in the roadway area comprises, each guide trajectory body in the roadway area is a color strip;

wherein the plurality of preset calibration tags in the public area are formed by intersections of the guide trajectory body in the public area and the plurality of guide trajectory bodies in the roadway area, and the preset calibration tags in the roadway area are formed by color change boundaries of the color strip of different colors, the plurality of preset calibration tags in the roadway area have same appearance, the plurality of preset calibration tags in the public area have same appearance, the plurality of preset calibration tags in the public area are different from the plurality of preset calibration tags in the roadway area;

wherein the preset initialization tag is set at some calibration tags among the plurality of preset calibration tags, the preset initialization tag is configured to indicate the mobile carrier to obtain the current initialization location information of the mobile carrier; and wherein each preset calibration tag corresponds to the first reference tag first reference tags provided in different positions have different appearances.

\* \* \* \* \*